United States Patent [19]

Inoue et al.

[11] Patent Number: 4,589,834
[45] Date of Patent: May 20, 1986

[54] DEVICE FOR GROOVING RUBBER MATERIAL

[75] Inventors: Seizaburo Inoue, Nashville; Norvel L. Smith, Smyrna, both of Tenn.

[73] Assignees: Bridgestone Corporation, Japan; Bridgestone (U.S.A.), Inc., Nashville, Tenn.

[21] Appl. No.: 763,591

[22] Filed: Aug. 8, 1985

[51] Int. Cl.$^4$ .............................................. B29C 15/00
[52] U.S. Cl. ..................................... 425/369; 425/363
[58] Field of Search ................ 425/290, 291, 363, 369

[56] References Cited

U.S. PATENT DOCUMENTS

| | | | |
|---|---|---|---|
| 3,197,536 | 7/1965 | French | 425/363 X |
| 4,033,709 | 7/1977 | Kroyer | 425/369 X |
| 4,245,975 | 1/1981 | Hattori | 425/363 |

*Primary Examiner*—J. Howard Flint, Jr.

*Attorney, Agent, or Firm*—Sughrue, Mion, Zinn, Macpeak, and Seas

[57] ABSTRACT

Device for striating laterally or diagonally an unvulcanized rubber strip at equal intervals to create air escapes comprises a pleat roll having a plurality of rollers, each of which presses the rubber strip to the pleat roll independently and which have gaps between roller of the first pressing member. A second pressing member includes a plurality of roller, each of which presses the rubber strip to the pleat roll independently and which have the widths greater than the gaps between rollers of the first pressing and the gaps between rollers of the second pressing member narrower than the widths of the rollers of the first pressing member. The second pressing member is positioned to connect the discontinuous striae of the rubber strip in the lateral or diagonal direction, which are striatec with the first pressing member and the ridges of the roll. A transfer device is positioned interpose to the rubber strip between the pleat roll and the first and second members.

8 Claims, 5 Drawing Figures

DEVICE FOR GROOVING RUBBER MATERIAL

FIELD OF THE INVENTION

This invention relates to a device for striating laterally or diagonally rubber material such as a strip at equal intervals to provide air escapes.

BACKGROUND OF THE INVENTION

Rubber goods such as tires usually comprise many rubber strips which are assembled in the building process. Air escapes for the rubber strips are very important in the manufacture of good rubber goods to prevent voids, delamination and the like. One technique is to use a multiplicity of film rolls having thicknesses of 1 to 5 mm and a pleat roll having a plurality of ridges thereon in the horizontal direction this places many continuous striae on rubber strips. This prior art is shown in FIG. 1(a) and FIG. 1(b).

FIG. 1(a) is a partial front view of the device using a multiplicity of film rolls. FIG. 1 (b) is a partial sectional view thereof. A rubber strip 7 is interposed between a pleat roll 1 having a plurality of ridges thereon and a multiplicity of film rolls 2 made of heavy metal such as iron. The sheet or strip 7 pressed to have many striae in the lateral direction thereof and transferred with a belt conveyer 6. The film rolls 2 are supported by a frame 5. The rolls 2 and the frame 5 each has slits 4 in the vertical direction for securing a lock rod 3. This allows independent vertical movemetn about rod 3 constrained only by the slits.

Accordingly, each of the film rolls 2a presses the rubber strip 7 to the pleat roll 1 by its own weight independently of the other rolls. Rubber strips, however, usually have various cross-sectional shapes so that it is very difficult for the film rolls 2 to striat the rubber strips uniformly. Moreover, the film rolls 2 have a serious drawback in that cement and other materials which are attached to the surface of the film rollers tend to adhere the film rolls together and prevent them from pressing rubber strip. Cement such as splice cement and under cement are applied to the surface of rubber strips to achieve tackiness. Accordingly, it is difficult to obtain continuous and uniform straie on rubber strips.

SUMMARY OF THE INVENTION

It is, therefore, an object of the invention to advantageously overcome the aforementioned drawback of the prior art.

According to the present invention, a device for striating laterally or diagonally an unvulcanized rubber strip at equal intervals to create air escapes comprises a pleat roll having a plurality of ridges thereon in the horizontal direction a first pressing member including a plurality of rollers, each of which presses the rubber strip to the pleat roll independently and which have gaps between rollers of the first pressing member. A second pressing member includes a plurality of rollers, each of which presses the rubber strip to the pleat roll independently and which have the widths greater than the gaps between rollers of the first pressing member and the gaps between rollers of the second pressing member narrower than the widths of the rollers of the first pressing member. The second pressing member is positioned to connect the discontinuous striae of the rubber strip in the lateral or diagonal direction, which are striated with the first pressing member and the ridges of the roll. A transfer device is positioned to interpose the rubber strip between the pleat roll and the first and second pressing members.

DETAILED DESCRIPTION OF THE INVENTION

Figure 1A:
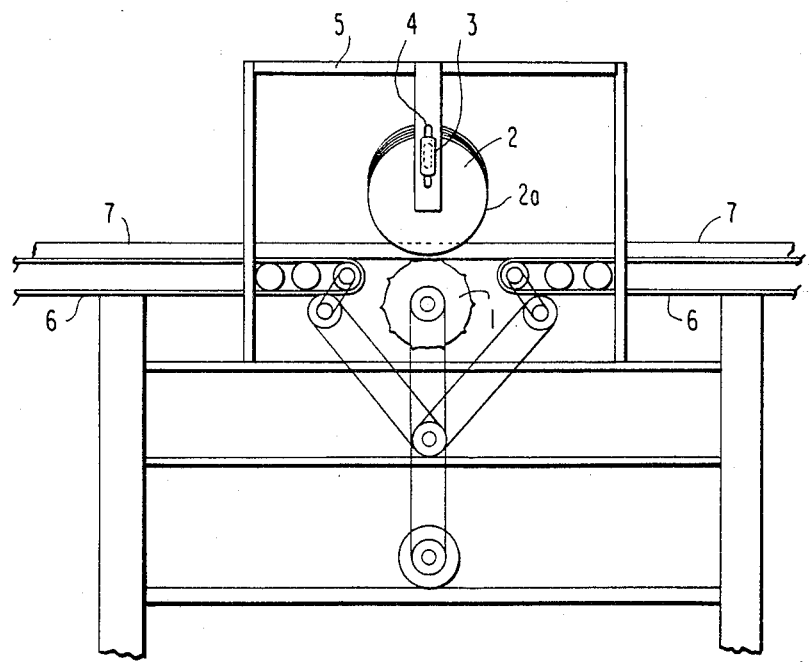
FIG. 1(A) is a partial front view of the device of a prior art using a multiplicity of films rolls.
Figure 1B:
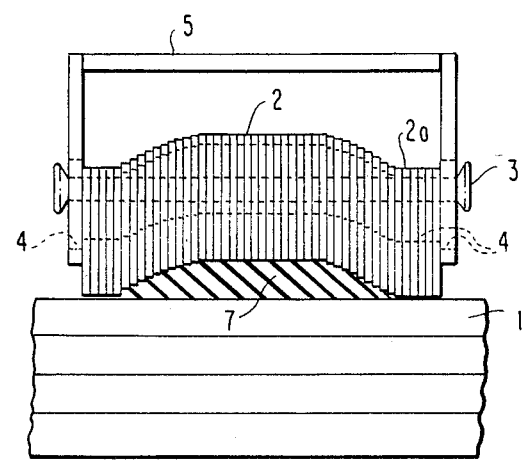
FIG. 1(B) is a partial sectional view of the device of the prior art.
Figure 2A:
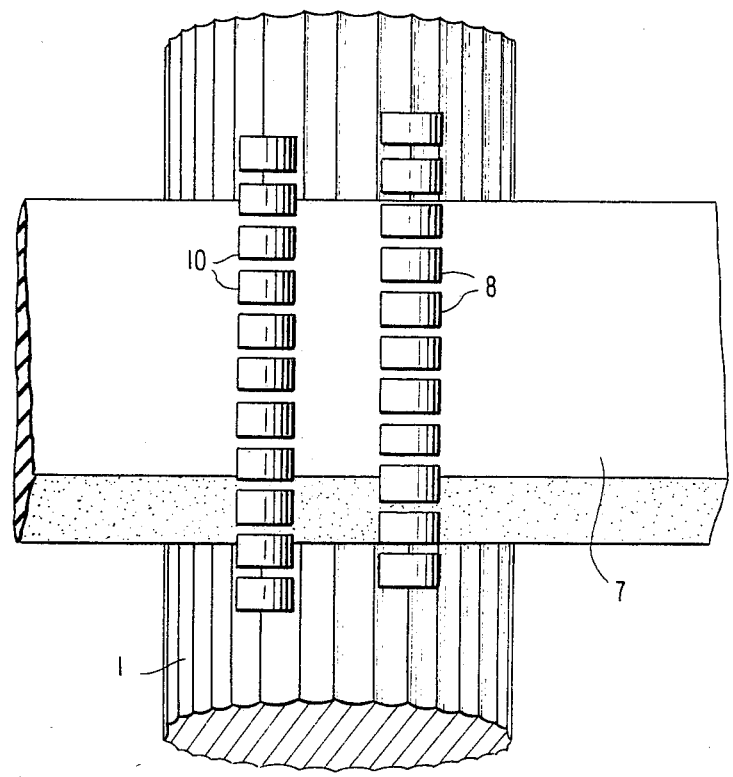
FIG. 2(A) is a partially cross-sectional side view of preferred embodiment of the device according to the invention.
Figure 2B:
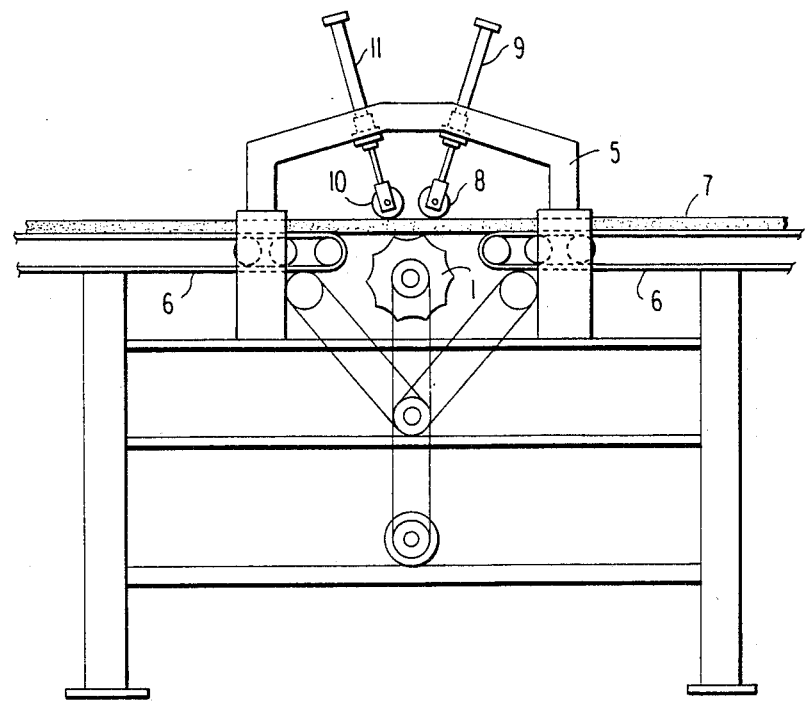
FIG. 2(B) is a partial front view of the embodiment of FIG. 2(B) and, FIG. 3 is a partial front view of another preferred embodiment of the device according to the invention.

FIG. 2(a) and FIG. 2(b) illustrated a first preferred embodiment of the device for striating laterally a rubber strip at equal intervals to create air escapes. Numeral 1 indicates a pleat roll having a plurality of ridges thereon in the horizontal direction. Numerals 8 and 9 designate a first pressing member, where numeral 8 is a plurality of rollers and numeral 9 is a plurality of air pressure cylinders. Numerals 10 and 11 denote a second pressing member, where numeral 11 is a plurality of air pressure cylinders. Numeral 5 is a frame for supporting a first pressing member 8, 9 and a second pressing member 10, and 11. Numeral 6 denotes a belt conveyer as a transferring device to interpose a rubber strip 7 between the pleat roll 1 and the first and second pressing members 8 and 10. It is to be understood that hydraulic pressure cylinders may be employed instead of air pressure cylinders.

Each gap between rollers of the first pressing member 8 should be narrower than each width of rollers of the second pressing member 10. Each gap between rollers of the second pressing member 10 should be narrower than each width of rollers of the first pressing member 8. Such is illustrated in FIG. 2A.

It is preferred that each gap between rollers of th first pressing member 8 be narrower than half of that width of rollers of the second pressing member 10 and each gap between rollers of the second pressing member 10 be narrower than half of the width of rollers of th first pressing member 8. This permits the device to striate a rubber strip continuously and completely.

Unvulcanized rubber strips are usually striated in the lateral direction. However, if the direction of the ridges of a pleat roll is changed to a diagonal direction, rubber strips can also be striated in the diagonal direction thereof.

It is preferred that the first pressing member and the second pressing member include a plurality of air pressure cylinders or hydraulic pressure cylinders, respectively. Better results are obtained to achieve continuous and uniform striae of a unvulcanized rubber strip when automatic pressure control is applied to the air pressure cylinders or the hydraulic pressure cylinders respectively and independently varied by the amount of pressure proportional to square of the gauge of the rubber strip at the point of contact with each roller of the first pressing member and the second pressing member.

Figure 3:
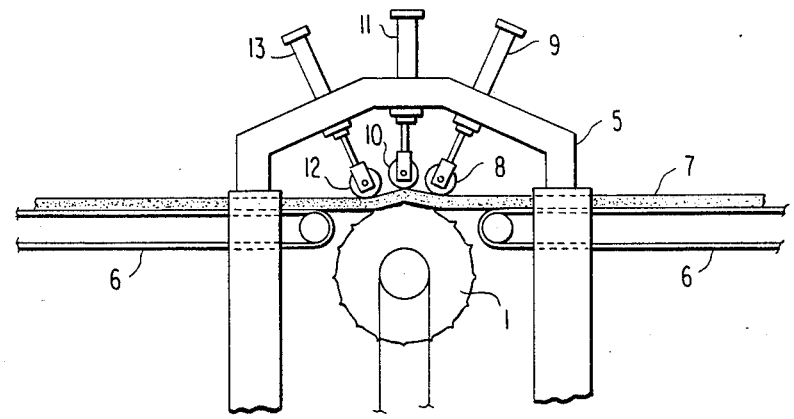

FIG. 3 illustrates another embodiment of the device according to this invention. In FIG. 3, numerals 12 and 13 denote a third pressing member, where numeral 12 is a plurality of rollers and numeral 13 is a plurality of air pressure cylinders or hydraulic pressure cylinders. Each of rollers presses the rubber strip 7 to the pleat roll 1 independently. When a multiplicity of rollers are necessary for striating, a third pressing member is available for connecting the discontinuous striae of said rubber strip in the lateral or diagonal direction, which is striated with the first and second pressing member and the ridges of said roll. Thus, a diagonal striation is created on the rubber strip.

As mentioned above, according to the present invention, continuous and uniform striae of an unvulcanized rubber strip can be obtained without cements or fur trouble.

What is claimed is:

1. A device for striating an unvulcanized rubber strip at equal intervals comprising:
   (a) a pleat roll having a plurality of ridges disposed thereon in the axial direction of the roll,
   (b) a first pressing member including a plurality of first rollers, each of which presses said rubber strip to said pleat roll independently, said first rollers arranged to gaps between them,
   (c) a second pressing member including a plurality of second rollers, each of which presses said rubber strip to said pleat roll independently, said second rollers having widths greater than the gaps between said first rollers of the first pressing member and the gaps between said second rollers narrower then the widths of said first rollers, and being positioned so as to connect the discontinuous striae of said rubber strip striated with the first pressing member and the ridges of said roll, and
   (d) transferring means so as to interpose and move said rubber strip between said pleat roll and the first and second pressing members.

2. A device of claim 1, wherein said gaps between said first rollers are narrower than one-half of the widths of said second rollers.

3. A device of claim 1, wherein said gaps between said second rollers are narrower than one-half of the widths of said rollers of the first pressing member.

4. A device of claim 1, wherein said first pressing member and said second pressing member include a plurality of air pressure cylinders.

5. A device of claim 1, wherein said first pressing member and said second pressing member include a plurality of hydraulic pressure cylinders.

6. A device of claim 4, further comprising automatic pressure control means to actuate said air pressure cylinders determined by the amount of the gauge of said rubber strip at the point of contact with each roller of said first pressing member and said second pressing member.

7. A device of claim 5, further comprising automatic pressure control means to actuate said hydraulic pressure cylinders determined by the amount of th gauge of said rubber strip at the point of contact with each roller of said first pressing member and said second pressing member.

8. A device of claim 1, further comprising a third pressing member including a plurality of thirsd rollers, each of said third rollers pressing said rubber strip to said pleat roll independently, so as to connect the discontinuous striae of said rubber strip striated with the first and second pressing member and the ridges of sail roll.

* * * * *